US 11,991,327 B2

(12) United States Patent
Kawasaki

(10) Patent No.: US 11,991,327 B2
(45) Date of Patent: May 21, 2024

(54) IMAGE READING DEVICE HAVING A READING UNIT THAT INCLUDES A POSITION REFERENCE

(71) Applicant: CANON KABUSHIKI KAISHA, Tokyo (JP)

(72) Inventor: Shigeru Kawasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/691,992

(22) Filed: Mar. 10, 2022

(65) Prior Publication Data

US 2022/0311896 A1 Sep. 29, 2022

(30) Foreign Application Priority Data

Mar. 26, 2021 (JP) ................................ 2021-053210

(51) Int. Cl.
*H04N 1/00* (2006.01)
*H04N 1/23* (2006.01)

(52) U.S. Cl.
CPC ..... *H04N 1/00816* (2013.01); *H04N 1/00702* (2013.01); *H04N 1/233* (2013.01)

(58) Field of Classification Search
None
See application file for complete search history.

(56) References Cited

U.S. PATENT DOCUMENTS

| | | | | |
|---|---|---|---|---|
| 2010/0073737 A1* | 3/2010 | Honda | ................ | H04N 1/1017 358/474 |
| 2010/0220344 A1* | 9/2010 | Tashiro | ................ | H04N 1/6086 358/448 |
| 2010/0277776 A1* | 11/2010 | Osakabe | ................ | H04N 1/047 358/474 |
| 2011/0032582 A1* | 2/2011 | Yang | ................ | H04N 1/1017 358/474 |
| 2012/0281260 A1* | 11/2012 | Ikeno | ................ | H04N 1/1061 358/474 |
| 2015/0156360 A1* | 6/2015 | Horiguchi | ................ | H04N 1/00599 358/498 |

FOREIGN PATENT DOCUMENTS

JP 2015106854 A 6/2015

* cited by examiner

*Primary Examiner* — Miya J Cato
(74) *Attorney, Agent, or Firm* — Canon U.S.A., Inc. I.P. Division

(57) ABSTRACT

An image reading device includes first glass, an adjacent portion adjacent to the first glass, a reading unit, and a position reference portion. The first glass enables an document to be placed on a front surface side of the document. The reading unit is capable of being in contact with at least one of the adjacent portion and the first glass and reads, from a back surface side of the first glass, the document placed on the first glass by using a sensor while moving from the adjacent portion side in a movement direction. The position reference portion is disposed on the front surface side of the first glass and serves as a reference of a position of the reading unit in the movement direction. When the position reference portion is read by the reading unit, the reading unit is in contact with the adjacent portion and the first glass.

12 Claims, 13 Drawing Sheets

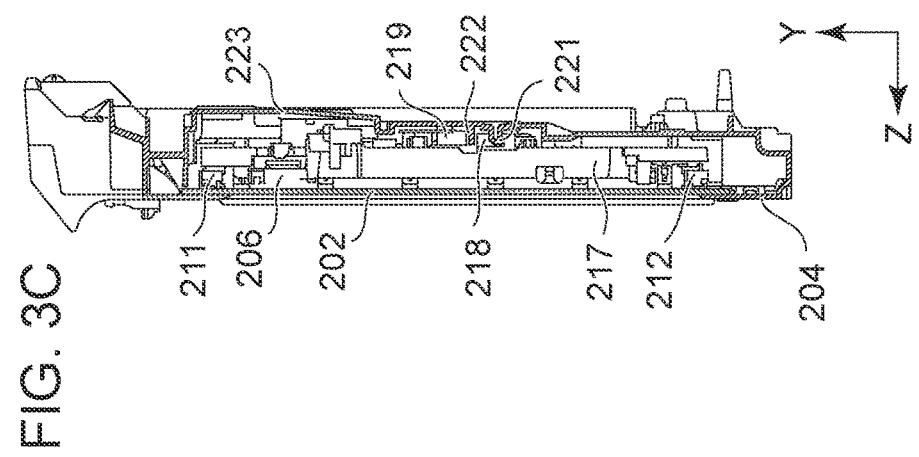
FIG. 3C
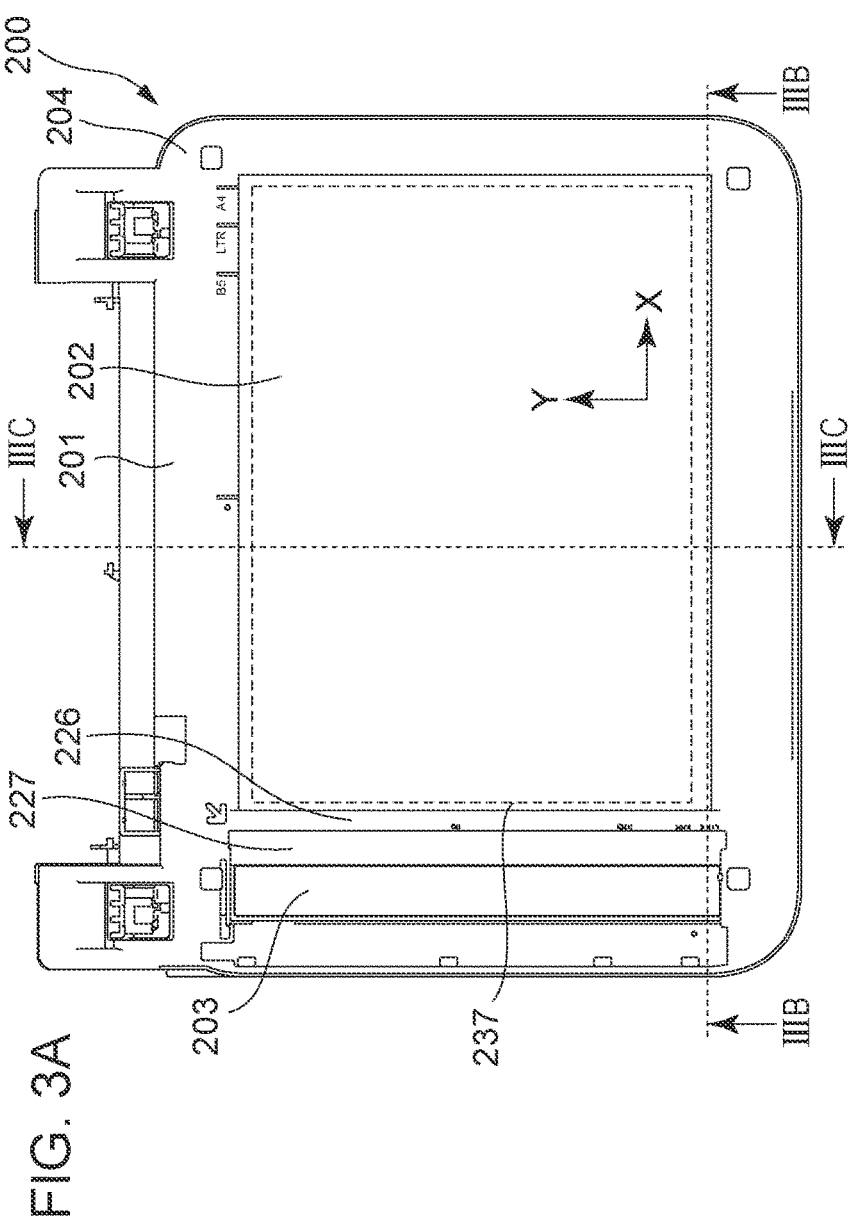
FIG. 3A
FIG. 3B

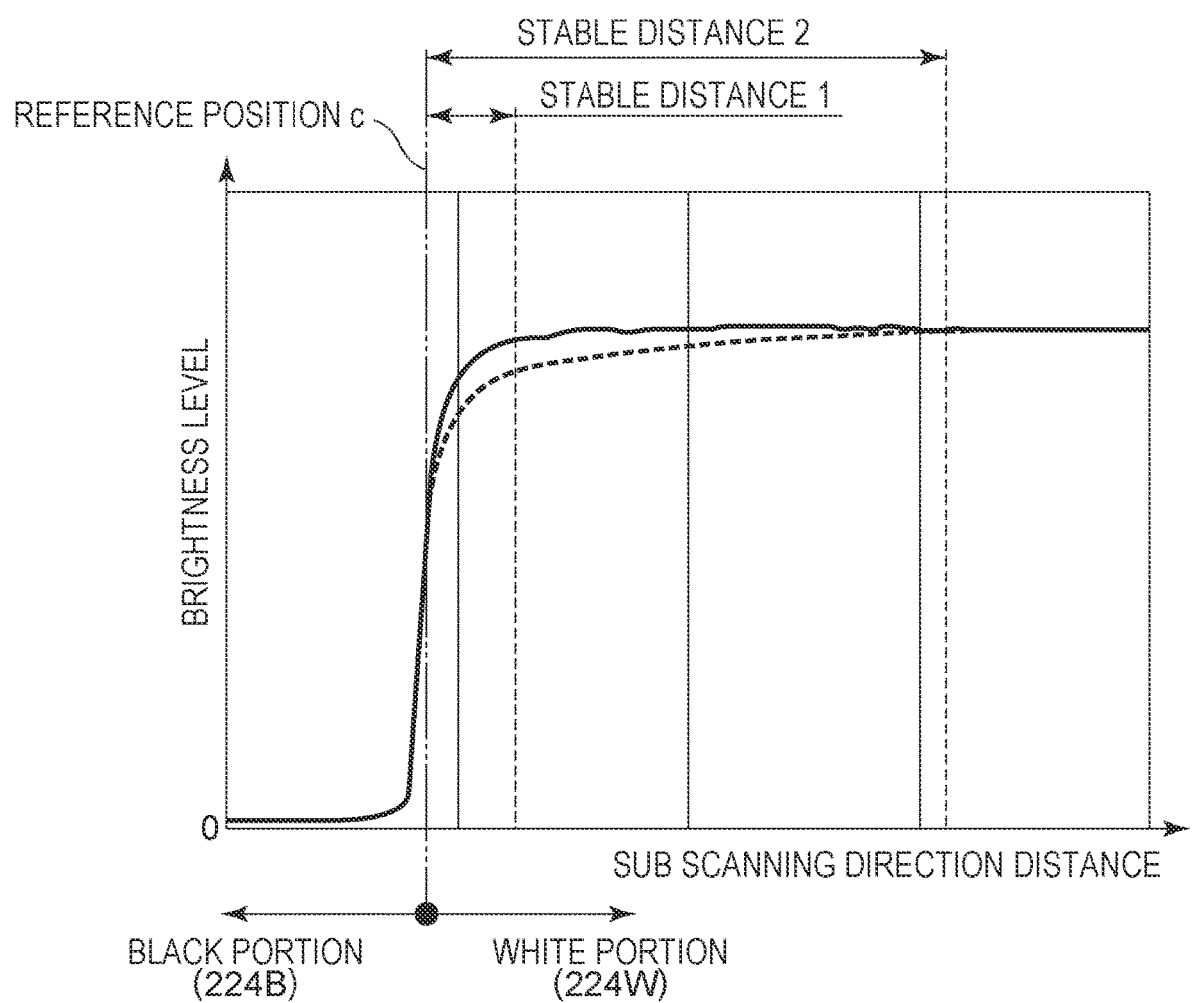

IMAGE READING DEVICE HAVING A READING UNIT THAT INCLUDES A POSITION REFERENCE

BACKGROUND

Field

The present disclosure relates to an image reading device.

Description of the Related Art

Some existing image reading devices are capable of employing both a technique for reading an original document while moving a reading unit under first glass and a technique for reading a conveyed original document by using a reading unit that is stationary under second glass. When reading an original document by a moving reading unit, it is desirable that the reading unit be capable of moving stably. According to Japanese Patent Laid-Open No. 2015-106854, a step is generated between the first glass and a separating member located between the first glass and the second glass for separating the original document from the second glass. In addition, a step is generated between the second grass and the separating member. The steps cause an issue. To eliminate the steps, a guide member that extends across both the second glass and the separating member is used.

According to Japanese Patent Laid-Open No. 2015-106854, when reading a white reference member for calibrating an output from a sensor, the reading unit is in contact with only the first glass. However, Japanese Patent Laid-Open No. 2015-106854 does not describe a position reference member for calibrating the position of the original document with respect to the reading unit. A structure in which the reading unit is in contact with only the first glass when reading the position reference member increases the size of the image reading device.

SUMMARY

The present disclosure provides an image reading device that does not increase the size thereof, even with the structure in which the position reference member is read by using a reading unit.

According to an aspect of the present disclosure, an image reading device includes first glass configured to enable an original document to be placed on a front surface side of the original document, an adjacent portion adjacent to the first glass, a reading unit that is capable of being in contact with at least one of the adjacent portion and the first glass and is configured to read, from a back surface side of the first glass, the original document placed on the first glass by using a sensor while moving from the adjacent portion side in a movement direction, and a position reference portion that is disposed on the front surface side of the first glass and serves as a reference of a position of the reading unit in the movement direction, wherein, when the position reference portion is read by the reading unit, the reading unit is in contact with the adjacent portion and the first glass.

Further features of the present disclosure will become apparent from the following description of exemplary embodiments with reference to the attached drawings.

BRIEF DESCRIPTION OF THE DRAWINGS

FIGS. 3A and 3D are a top view and cross-sectional views of a scanner unit that reads an original document that is placed. FIG. 3B is a cross-sectional view taken along a line IIIB-IIIB, and FIG. 3C is a cross-sectional view taken along a line IIIC-IIIC.

FIG. 12 illustrates the distribution of the brightness level of an image obtained by reading a reference member.

DESCRIPTION OF THE EMBODIMENTS

Figure 1:
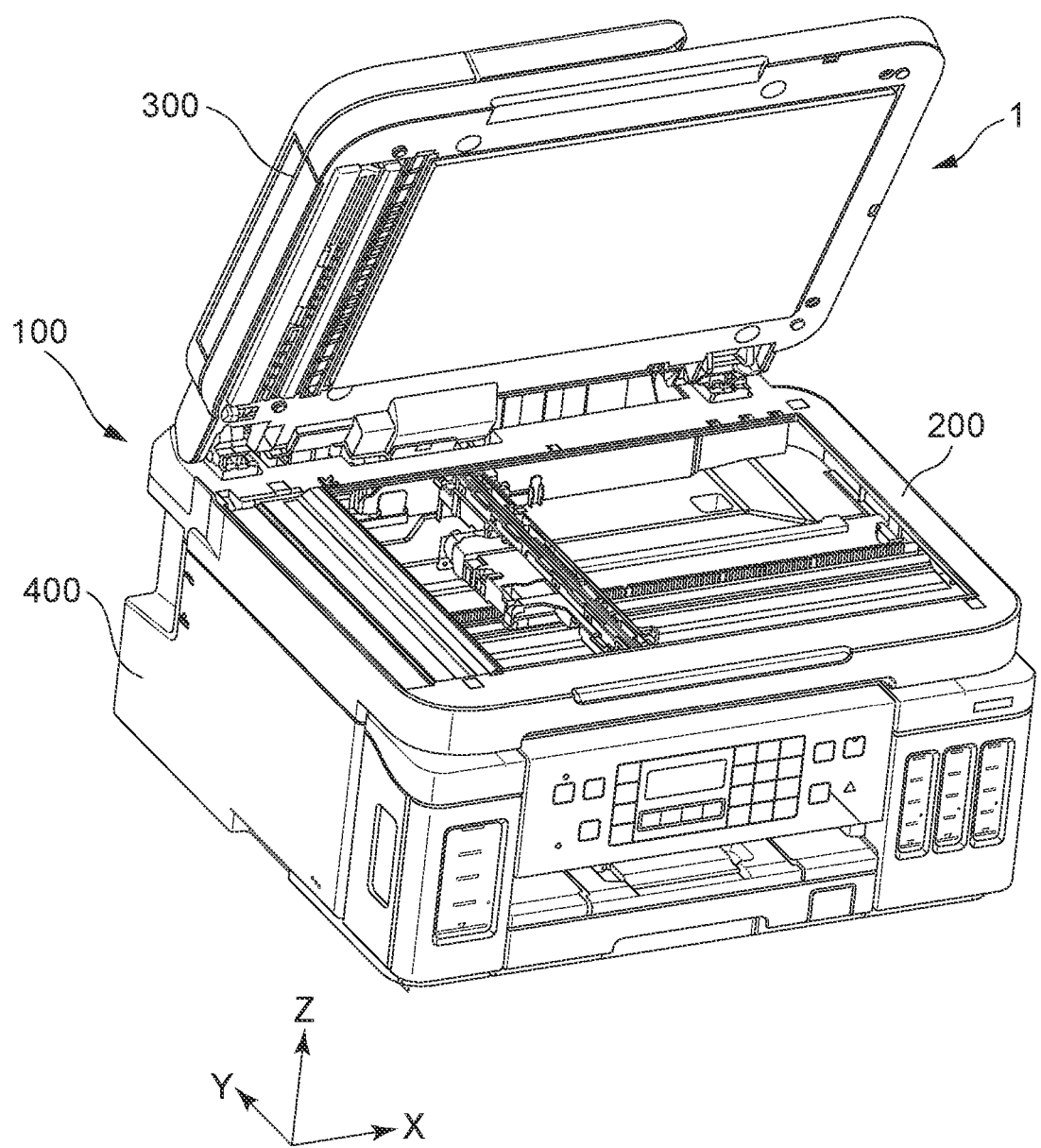
FIG. 1 is a perspective view of an image reading device with a document conveyance unit being open.

Embodiments of the present disclosure are described below with reference to the accompanying drawings. It should be noted that the following description of embodiments is in no way intended to limit the disclosure, and all of the features and the combinations thereof described in the embodiments are not necessarily essential to the disclosure. Note that in the description below, the same reference numerals refer to similar structure throughout the embodiments. In addition, relative locations, the shapes, and the like of the constituent elements described in the embodiments are illustrative only and is in no way intended to limit the scope of the disclosure. Accordingly, various other embodiments of the disclosure can be made, and various removals, substitutions, combinations, and modifications can be made to the embodiments without departing from the spirit and scope of the disclosure.

The image reading device according to the present disclosure can be applied to a flatbed scanner device, a copying machine in which a flatbed scanner device and a printing device are combined, a facsimile, a multifunction device, and the like.

Embodiments

Image Reading Device

An image reading device 100 according to the present embodiment is a multifunction device 1 combined with a printing device 400 which is an ink jet printer. FIG. 1 illustrates a document conveyance unit 300 that is open with respect to a document glass plate on which an original document for a scanner unit 200 is to be placed. The image reading device 100 includes the image reading unit 200 (the scanner unit) and the document conveyance unit 300 (ADF: Auto Document Feeder) disposed on the image reading unit 200. The image reading unit 200 is disposed on the printing device 400. The printing device 400 can convey a sheet from a cassette to a printing unit and record an image on the sheet in the printing unit. Note that the printing unit is of an inkjet type that ejects ink from a print head onto a sheet, but may be of an electrophotographic type. Furthermore, the multifunction device 1 can read an image printed on an original document by the image reading device 100 and record the read image on a sheet by the printing device 400.

Figure 2:
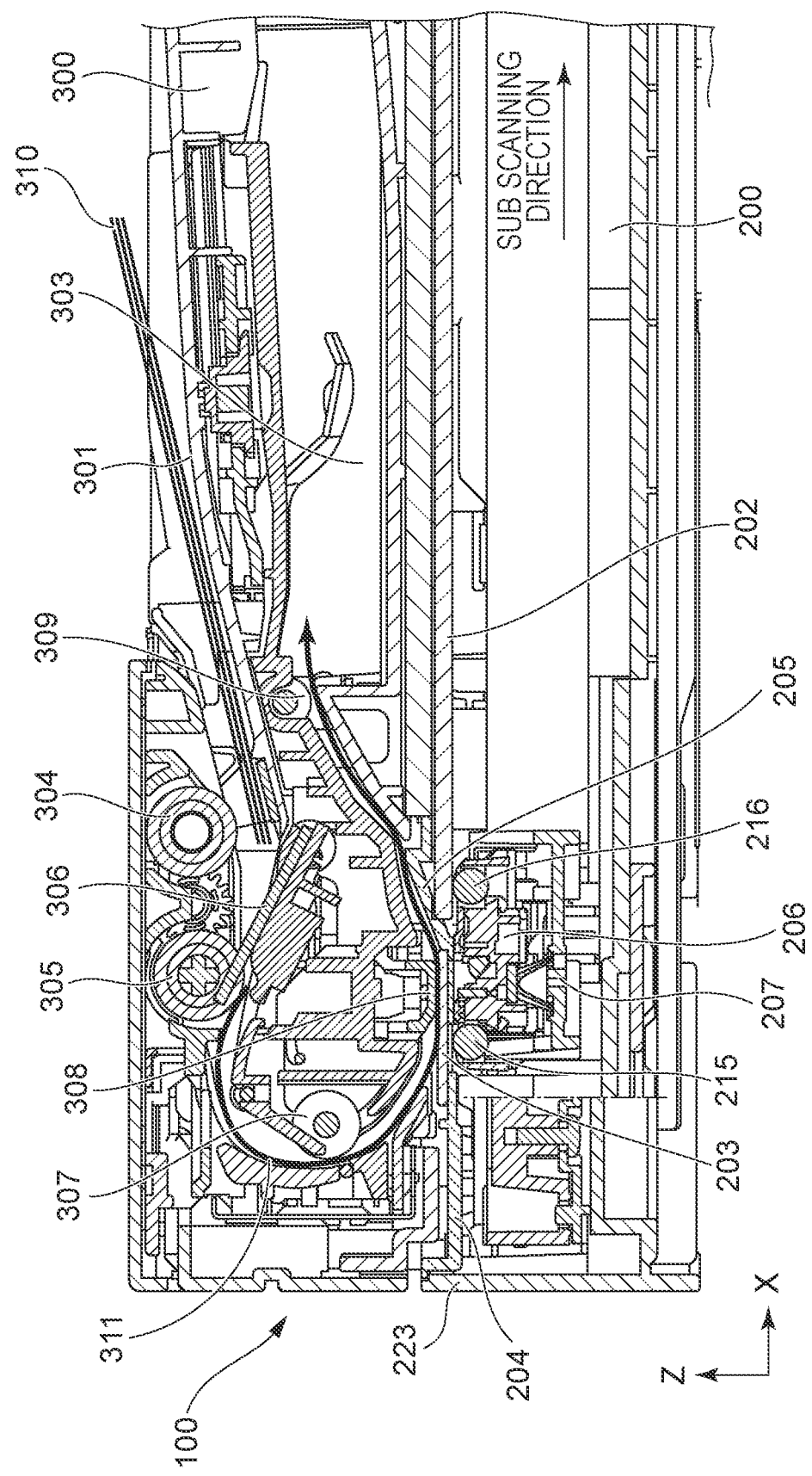
FIG. 2 is a cross-sectional view of the image reading device with the document conveyance unit being closed.

FIG. 2 is a cross-sectional view of the image reading device 100 in the X-Z plane of when the document conveyance unit 300 is closed. The document conveyance unit 300 has the structure of a document conveyance path 311 (a thick solid line arrow). Part of a glass frame unit 201 of the scanner unit 200 is used as part of the document conveyance path 311.

The image reading device 100 according to the present embodiment employs two methods for reading an original document. One is a flatbed type for reading an original document that is stationary, and the other is an auto document feed type for reading an original document that is being conveyed. A reading unit 207 that reads an original document can read one line of the image in the main scanning direction (the Y direction) by an image sensor 206. In the flatbed type, an original document is placed on the front surface of a document glass plate 202, and the entire original document is read by moving the reading unit 207 in the sub scanning direction (the movement direction, the X direction) intersecting the main scanning direction. In contrast, in the auto document feed type, the reading unit 207 is disposed at a predetermined position (an ADF position) under ADF glass 203, and the reading unit 207 reads an original document that is being conveyed by the document conveyance unit 300. In FIG. 2, the reading unit 207 in the scanner unit 200 is stopped at the ADF position to read an original document 310 conveyed by the document conveyance unit 300.

The document conveyance unit 300 includes a document tray 301 on which an original document is to be placed thereon, a document conveyance mechanism, and a document discharging unit 303. The document conveyance mechanism is the entire mechanism for conveying an original document from a pickup roller 304 to a discharge roller 309. The configuration of the document conveyance mechanism is described below in order from the upstream in the conveyance direction of the original document.

The original document 310 placed on the document tray 301 is conveyed toward a separation roller 305 by the pickup roller 304 of the document conveyance mechanism and, thereafter, is conveyed sheet by sheet downstream to a conveyance roller 307 by the separation roller 305 and a separation pad 306. Subsequently, the original document 310 is conveyed downstream to the ADF glass 203 by the conveyance roller 307. When the original document 310 passes through the ADF glass 203, a pressing plate 308 presses the original document 310 so that the original document 310 is in contact with the ADF glass 203.

At this time, the image on the original document 310 is read by the image sensor 206. The original document 310 that has passed through the ADF glass 203 is separated from the ADF glass 203 by a document separation surface 227 downstream of the ADF glass 203 and is discharged to the document discharging unit 303 by the discharge roller 309. An adjacent portion 205 is part of a glass frame 204, and the document separation surface 227 is formed on the upper side thereof. The ADF glass 203 is supported from below by the glass frame 204. In addition, a variety of document detection sensors (not illustrated) are disposed in the document conveyance mechanism. The document detection sensors detect the passage of the leading edge and the trailing edge of the original document and are used to control the time of reading the original document by the image sensor 206.

The configuration of the scanner unit 200 of the image reading device 100 is described below with reference to FIGS. 3A to 3D and FIGS. 4 to 8.

Figure 3D:
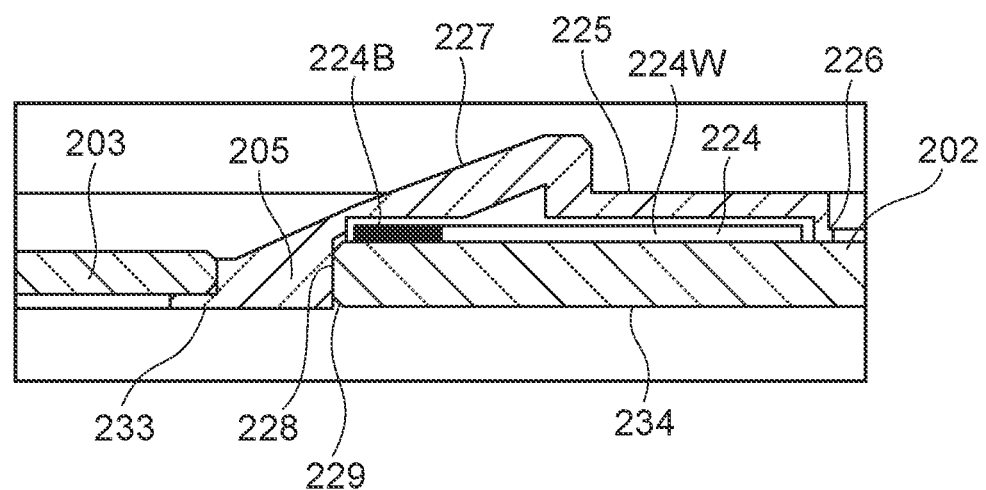

FIGS. 3A and 3D are a top view and cross-sectional views of the scanner unit 200 with the document conveyance unit 300 removed. FIG. 3A is a top view of the entire glass frame unit 201, FIG. 3B is a cross-sectional view taken along a line IIIB-IIIB, and FIG. 3C is a cross-sectional view taken along a line IIIC-IIIC. FIG. 3D is an enlarged view of a cross-sectional portion IIID around the adjacent portion 205 in FIG. 3B. The glass frame unit 201 includes the document glass plate 202 on which an original document is to be placed, the ADF glass 203 for reading a conveyed original document, and the glass frame 204 for holding these glasses. In addition, the glass frame 204 has the document separation surface 227 that forms part of the document conveyance path between the document glass plate 202 and the ADF glass 203. The adjacent portion 205 having the document separation surface 227 therein has a glass frame abutment portion 228 that abuts the side surface of the document glass plate 202 and a document abutment portion 226 that serves as a reference for the position of the original document. A glass frame guide surface 233 that is part of roller paths D1 and D2 of the reading unit 207 is provided on the back surface of the adjacent portion 205. The ADF glass 203 is held on the glass frame guide surface 233. The glass frame guide surface 233 has the same height as a document glass plate back surface 234 so that the reading unit 207 can move stably. Note that a chamfer portion 229 of the document glass plate 202 generates a step on the back surface of the adjacent portion 205.

Figure 4:
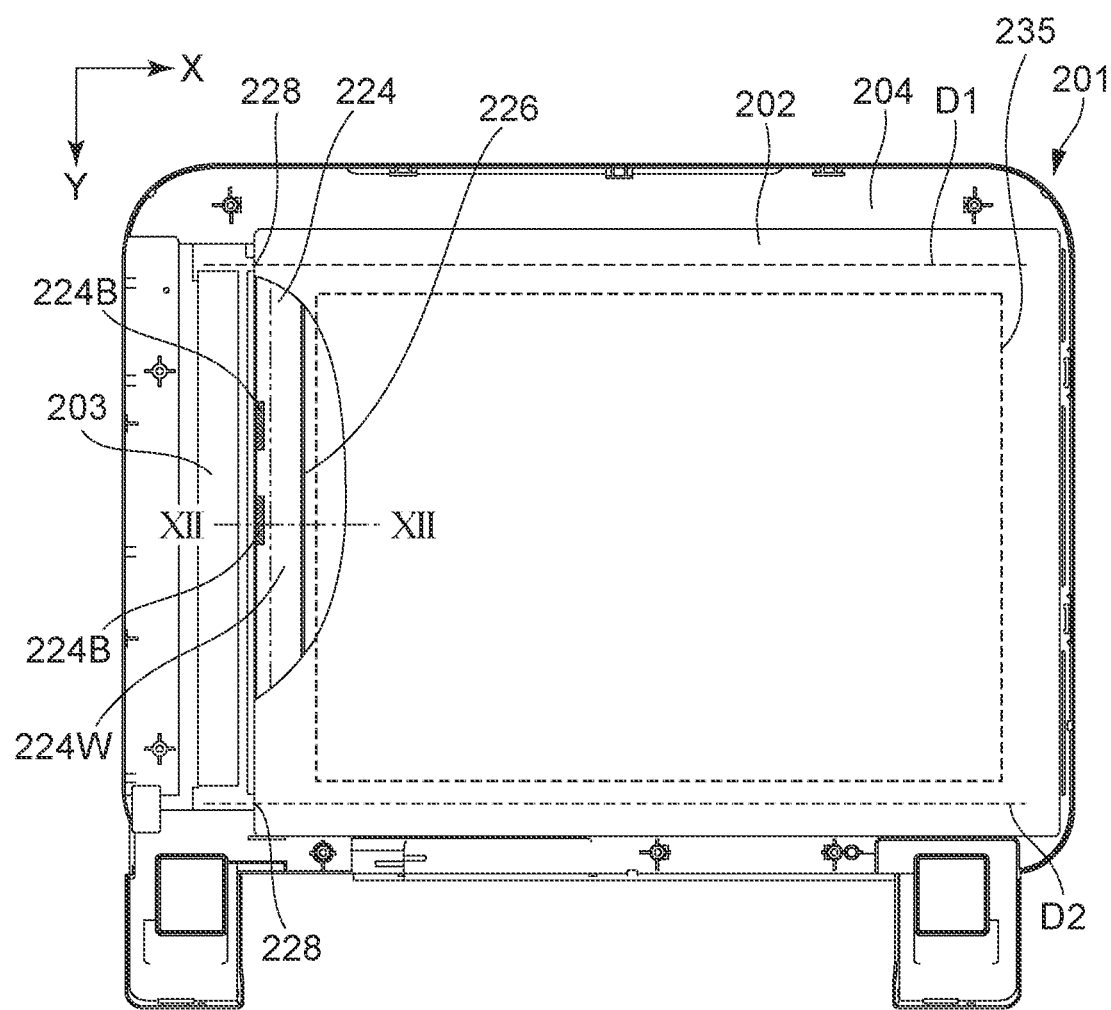
FIG. 4 is a back view of a glass frame unit.

FIG. 4 is a back view of the glass frame unit 201. The document glass plate 202 is abutted against the glass frame abutment portion 228 of the glass frame 204 and, thus, the position of the document glass plate 202 in the X direction is determined. A reference member 224 is disposed on the front surface (the back surface in FIG. 4) of the document glass plate 202 on which an original document of the document glass plate 202 is to be placed and below the document separation surface 227 of the adjacent portion 205 and a flat surface 225 that continues from the document separation surface 227. The reference member 224 is disposed, in the X direction, between the ADF glass 203 and a document reading area 237 in which a placed original document is read. In addition, the reference member 224 has a white reference portion 224W that is white and that is used to perform a shading correction for the image sensor 206 and a black portion 224B that is black and that serves as a position reference in the sub scanning direction of the image sensor 206. Note that the white reference portion 224W is adjacent to the black portion 224B. However, the white reference portion 224W used to perform a shading correction is a region extending from a two-dot chain line in FIG. 4 toward the document abutment portion 226. Furthermore, the width of the white reference portion 224W is greater than the width of the image sensor 206 in the main scanning direction. For this reason, an image can be captured by using all the elements of the image sensor 206. In contrast, the black portion 224B is part of the region of the image sensor 206 in the main scanning direction. The black portion 224B is located closer to the ADF glass 203 than the white reference portion 224W in the sub scanning direction.

Figure 5A:
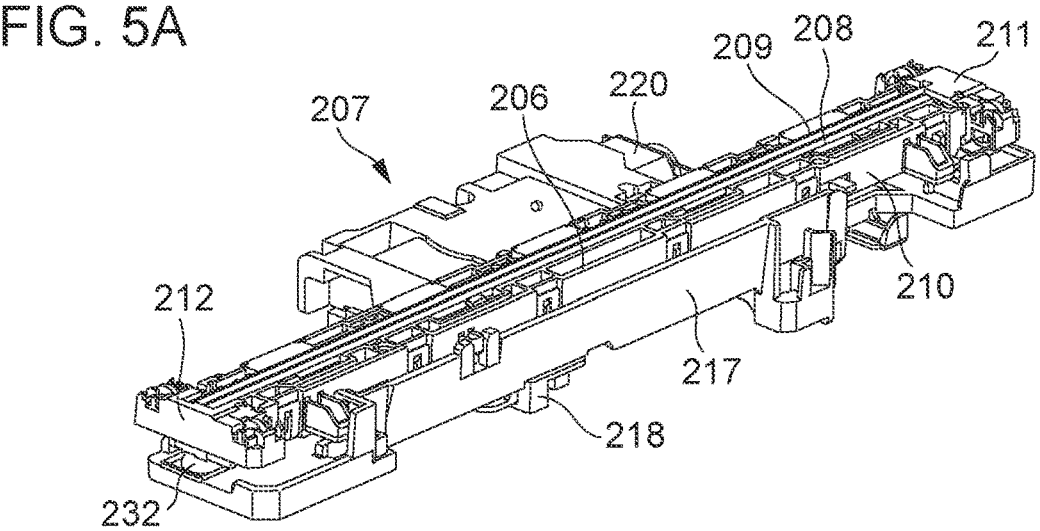
FIGS. 5A to 5C are perspective views of a reading unit.
Figure 5B:
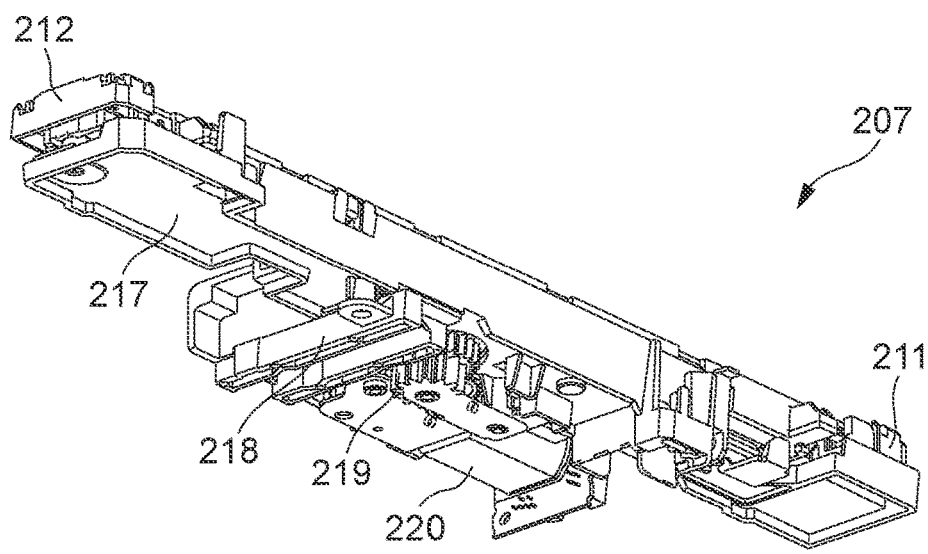
Figure 5C:
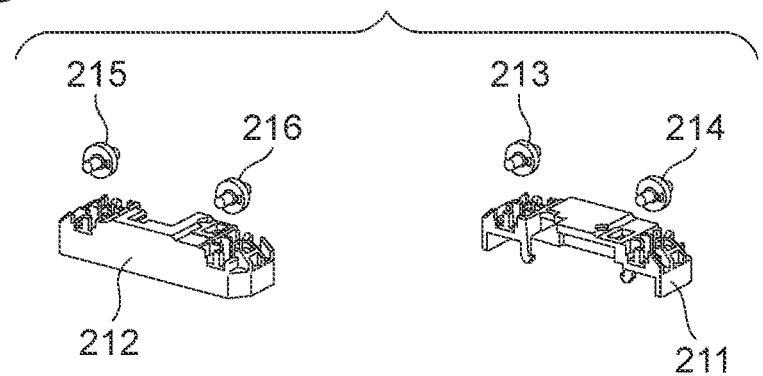

FIGS. 5A to 5C illustrate the reading unit 207 that reads an image of an original document. FIG. 5A is a top view of the reading unit 207, FIG. 5B is a view of the reading unit 207 as viewed from the back surface side, and FIG. 5C illustrates a roller unit. The reading unit 207 includes the image sensor 206, a sensor holder 217, a slider 218, and a drive unit for moving the reading unit 207. The drive unit includes a motor 220 which is a drive source, a speed reduction mechanism (not illustrated) for transmitting the driving force of the motor 220, and a drive gear 219. A roller unit 211 and a roller unit 212 that ensures a focal length from an original document are disposed at both ends of the image sensor 206 in the main scanning direction. In the roller units 211 and 212, rollers 213 and 214 and rollers 215 and 216, which are contact portions brought into contact with the adjacent portion and the document glass plate 202, are rotatably disposed, respectively, side by side in the sub scanning direction. Furthermore, a press spring 232 is disposed between the image sensor 206 and the sensor holder 217, and the image sensor 206 is pressed against the back surface of the document glass plate 202 at all times. These rollers roll on the glass frame unit 201 along the dotted lines D1 or D2 illustrated in FIG. 4 when the reading unit 207 moves in the sub scanning direction.

Figure 6:
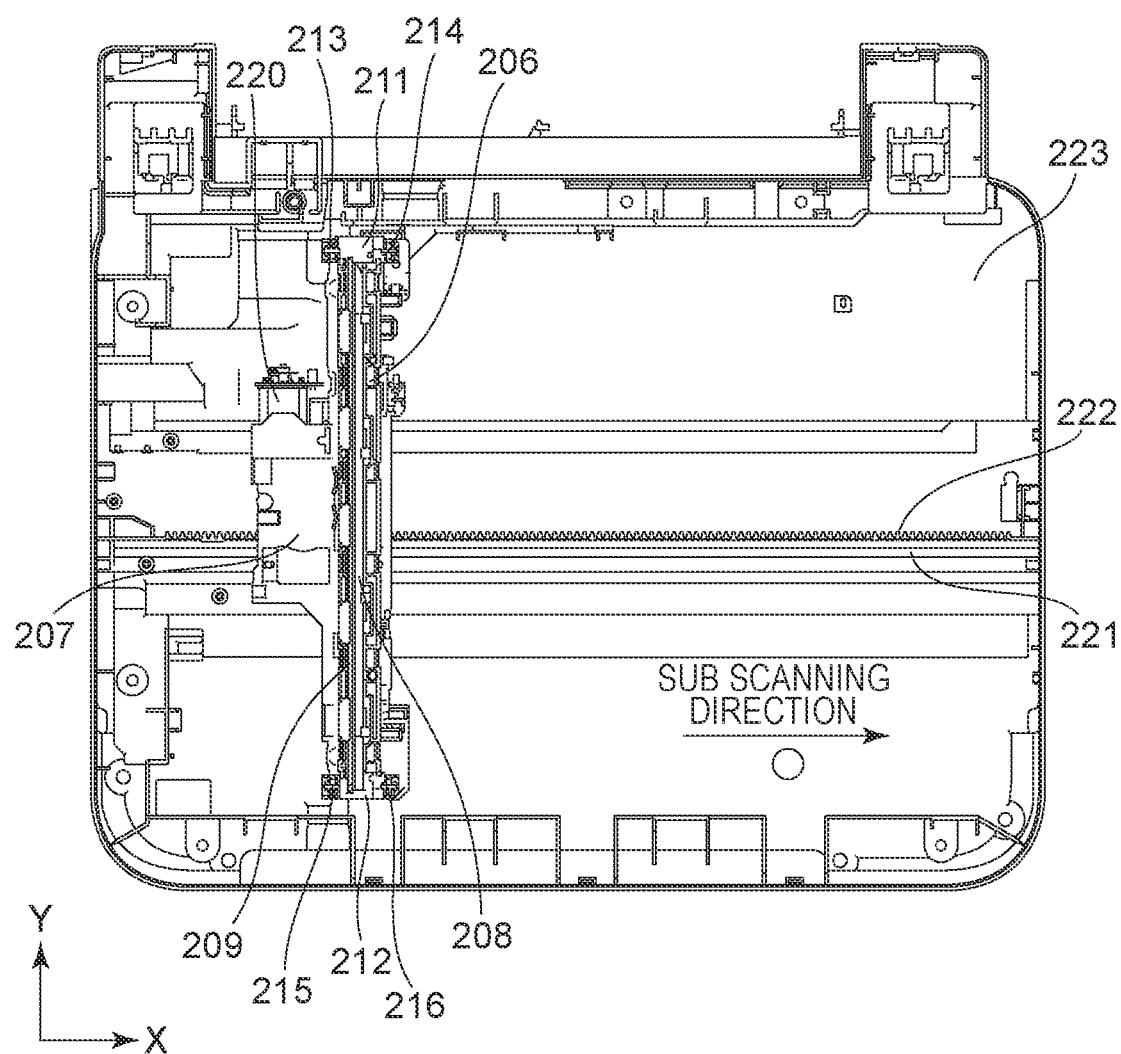
FIG. 6 is a top view of the internal configuration of the scanner unit.

FIG. 6 is a top view of the internal configuration of the scanner unit 200. In FIG. 6, the arrangement of the reading unit 207 and the base frame 223 of the scanner unit 200 is illustrated. A guide rail 221 having a longitudinal direction that is the same as the sub scanning direction and a rack 222 adjacent to the guide rail 221 are disposed in a substantially central portion of the base frame 223 in the main scanning direction. In the reading unit 207, the slider 218 is disposed on the guide rail 221 in a slidable manner in the sub scanning direction, and the drive gear 219 is disposed so as to mesh with the rack 222. In this manner, when the drive input is input to the motor 220, the drive gear 219 meshed with the rack 222 is rotated and, thus, the reading unit 207 can reciprocate along the guide rail in the sub scanning direction or the return direction. Note that the drive unit may be of a belt drive type that is disposed on the base frame 223 and transmits the driving force via a belt.

Figure 7:
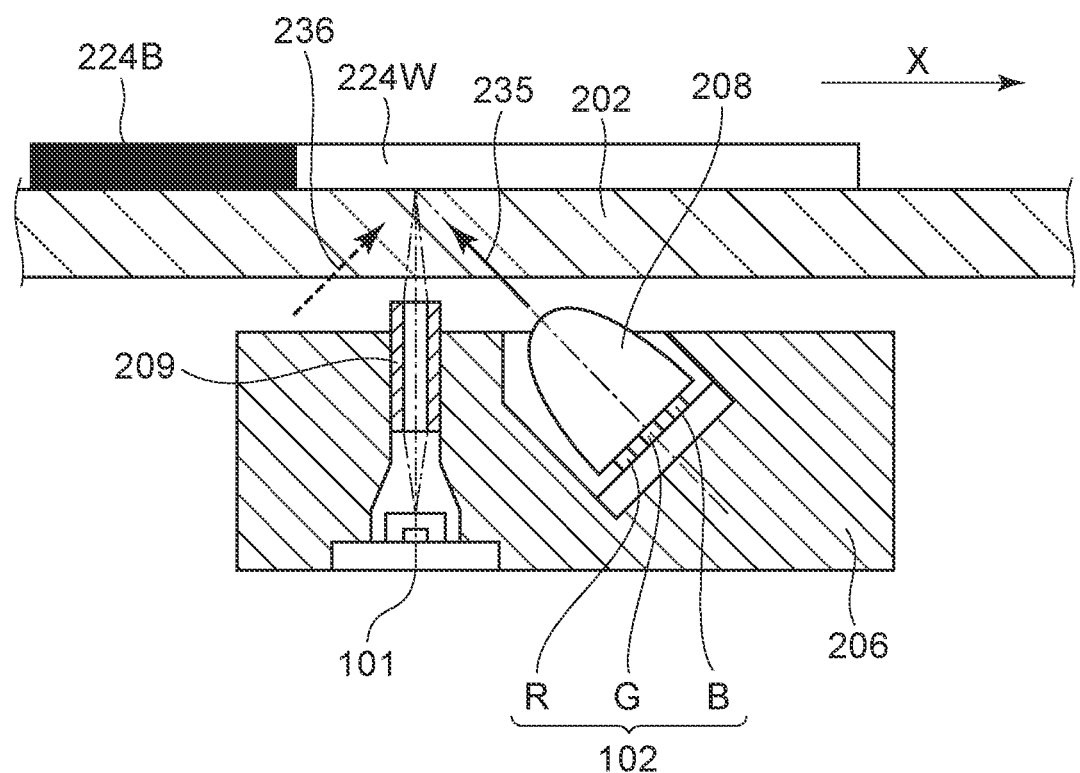
FIG. 7 is a cross-sectional view of an image sensor and its surroundings.

The electrical configuration of the reading unit 207 is described below with reference to FIGS. 7 and 8. FIG. 7 is a cross-sectional view of the image sensor 206 and its surroundings. The image sensor 206 incorporates three color light emitting elements (LEDs) 102, a rod lens array 209, and light receiving elements 101 in which a plurality of elements are arranged in the main scanning direction. The light emitted from the LED 102 to an original document is reflected by the document surface, and the reflected light passes through the rod lens array 209 to form an image on the light receiving elements 101. The image sensor 206 sequentially turns on the three color LEDs 102, and the image sensor 206 reads the reflected light from the original document for each color. In this manner, the intensity of the reflected light for each color can be acquired.

Figure 8:
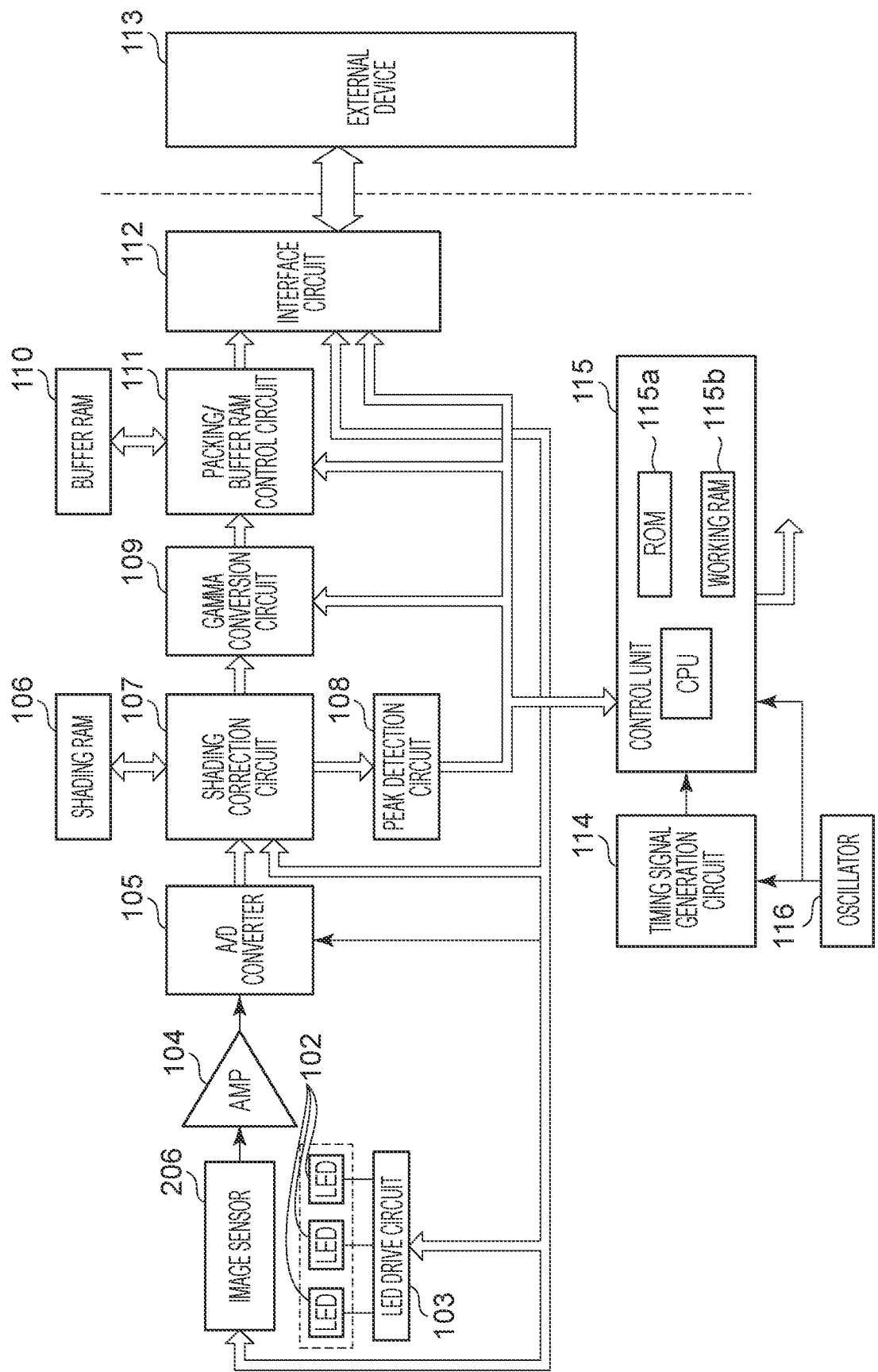
FIG. 8 is a block diagram of the electrical circuit configuration.

FIG. 8 is a block diagram of the configuration of a control circuit of the reading unit 207. The image sensor 206 is integrated with the three color LEDs 102 that are light sources. A control unit 115 moves the image sensor 206 in the sub scanning direction under the document glass plate 202 by using the reading unit 207. At the same time, the control unit 115 causes an LED drive circuit 103 to switch between the LEDs 102 of three colors on a line by line basis to light the LEDs 102. In this way, R, G, and B color images can be sequentially read. The signal output from the image sensor 206 is amplified by the amplifier (AMP) 104 and is converted into, for example, an 8-bit digital output by an A/D converter 105.

A shading RAM 106 stores data that is used for a shading correction. The data is obtained by performing arithmetic processing on the data read from the white reference portion 224W. A shading correction circuit 107 performs the shading correction on the image data read by the image sensor 206 on the basis of the data stored in the shading RAM 106. A peak detection circuit 108 is a circuit that detects the peak value of the read image data for each line. The peak detection circuit 108 is used to detect the reference position of the image sensor 206. A gamma conversion circuit 109 performs gamma conversion on the read image data in accordance with a gamma curve preset by an external device 113, such as a computer. A buffer RAM 110 is a memory that temporarily stores image data to match the time of the actual reading operation with communication with the external device 113. A packing/buffer RAM control circuit 111 performs a packing process in accordance with an image output mode (binary, 4-bit multiple values, 8-bit multiple values, 24-bit multiple values, etc.) preset by the external device 113. Furthermore, the packing/buffer RAM control circuit 111 performs a process of writing the data to the buffer RAM 110 and a process of transferring image data from the buffer RAM 110 to an interface circuit 112 and outputting the data. The interface circuit 112 receives a control signal and outputs an image signal from and to the external device 113. The control unit 115 includes a CPU, a ROM 115a that stores the procedure for a process, and a working RAM 115b. The control unit 115 controls each of the units in accordance with the procedure for the program stored in the ROM 115a. A timing signal generation circuit 114 frequency divides the output of an oscillator 116, which is a quartz oscillator, in accordance with the setting of the control unit 115 to generate various timing signals as a reference for operation.

Position of Reading Unit

Each of the operations performed by the reading unit 207 and the position of the reading unit 207 when the operation is performed are described below. The control unit 115 starts the initialization of the reading unit 207 first when a user turns on the power. When the initialization is completed, the reading unit 207 moves in the sub scanning direction to detect a reference mark and determines the reference position of the reading unit 207. Note that the reference position that serves as a reference for the position in the sub scanning direction is the boundary between the black portion 224B and the white reference portion 224W. That is, there is a boundary between the black portion 224B and the white reference portion 224W as the position reference portion, and the position reference portion functions as a reference mark. The RAM 115b stores the detected reference mark and the determined reference position. Subsequently, the control unit 115 moves the reading unit 207 in the sub scanning direction on the basis of the reference position and performs a shading process. Thereafter, the reading unit 207 stands by at the home position until it receives a command to read an image.

Each of the positions of the reading unit 207 from the time of initialization to the time of standby is described below with reference to FIGS. 9A to 11B.

Figure 9A:
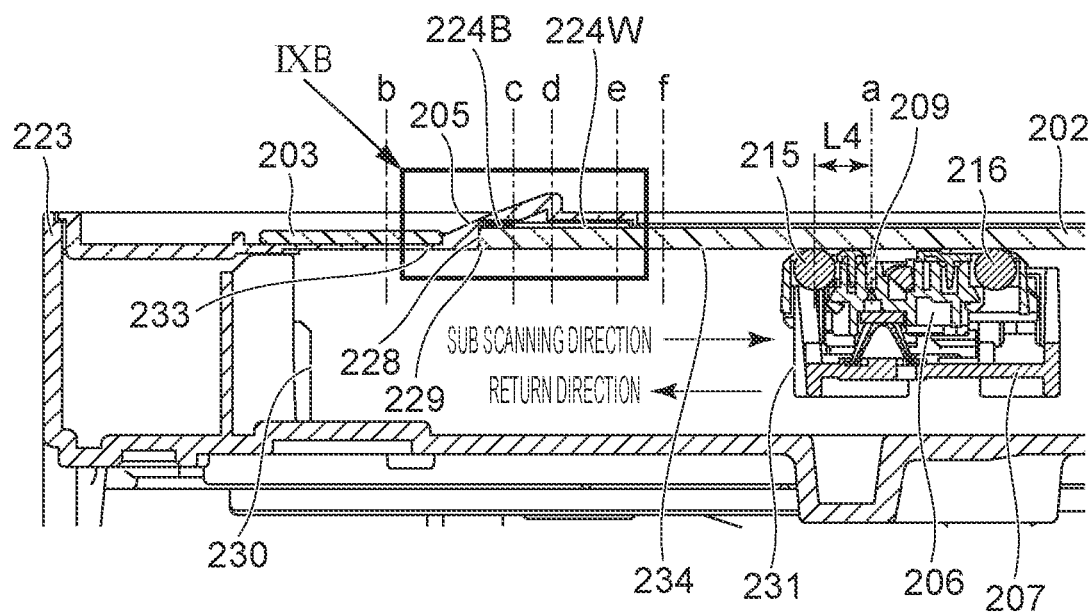
FIGS. 9A and 9B are cross-sectional views illustrating the positions at which the reading unit performs a variety of processes.
Figure 9B:
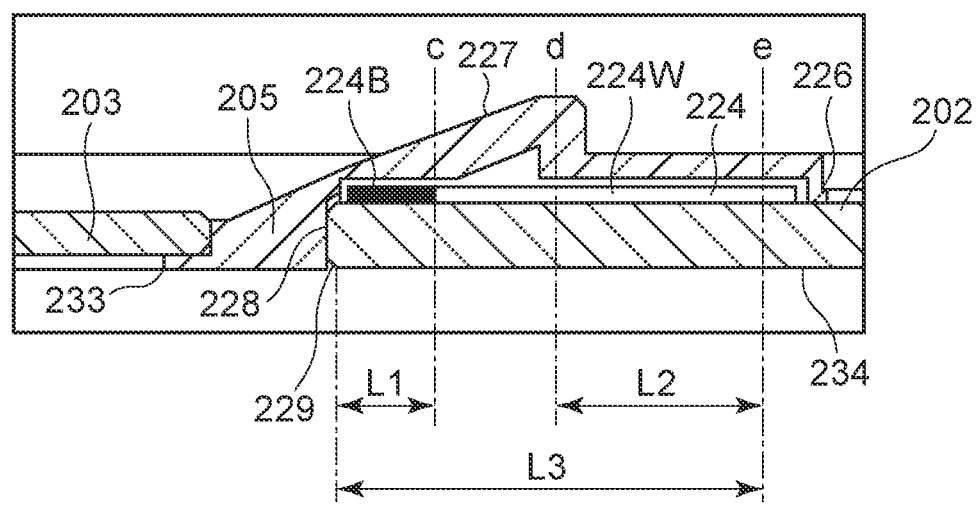

The positions marked a to f in FIGS. 9A and 9B are the positions of the optical centers (chain lines in FIGS. 9A and 9B) of the rod lens array 209 when each of the operations is performed by the reading unit 207. The positions a to f indicate as follows: a: the position before the power is turned on; b: the initialization position; c: the reference position; d: the home position (the shading start position); e: the shading end position; f: the document reading start position.

Figure 10A:
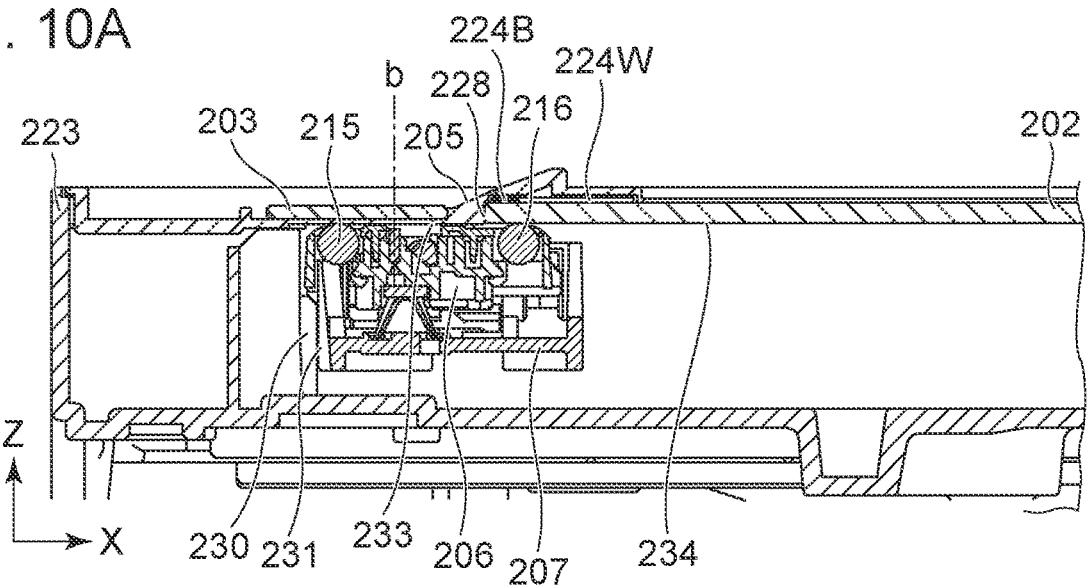
FIGS. 10A to 10C are cross-sectional views illustrating the positions of the reading unit from the time the power is turned on until the time an image is read.

For convenience of description, the position of the reading unit 207 before the power is turned on is marked a. However, the position can be any position. When the power is turned on, the RAM 115b does not have the current position information about the reading unit 207 and, thus, the control unit 115 starts the initialization operation on the reading unit 207. The reading unit 207 moves first in the return direction that is opposite to the sub scanning direction in which the image is read. Thereafter, when a sensor holder abutment portion 231 of the sensor holder 217 abuts an inner wall 230 of the base frame 223, the reading unit 207 stops moving. When the reading unit 207 cannot be moved by the inner wall 230, the electric current supplied to the motor 220 that drives the reading unit 207 increases. When the supplied electric current exceeds a threshold value, the control unit 115 can determine that the reading unit 207 abuts the inner wall 230 of the base frame 223. The position of the reading unit 207 at this time is the initialization position b (FIG. 10A). In addition, the roller 215 is in contact with the glass frame guide surface 233, and the roller 216 is in contact with the document glass plate back surface 234.

Subsequently, the reading unit 207 starts moving in the sub scanning direction to detect the position reference portion at the boundary between the white reference portion 224W and the black portion 224B of the reference member 224. At this time, the roller 215 comes into contact with the glass frame guide surface 233 and moves while rotating. In addition, the roller 216 comes into contact with the document glass plate back surface 234 and moves while rotating.

Figure 10B:
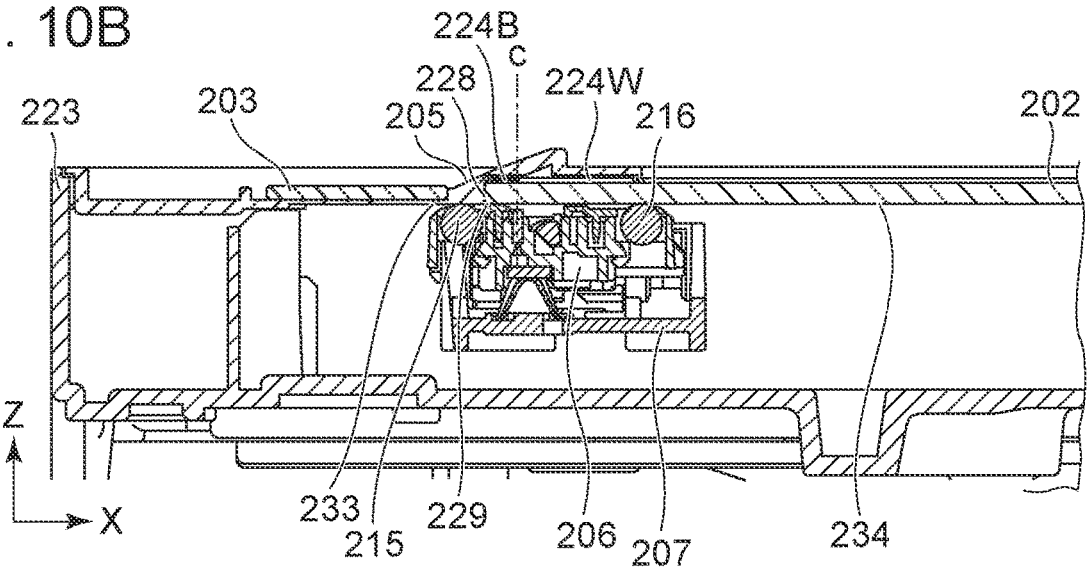
Figure 10C:
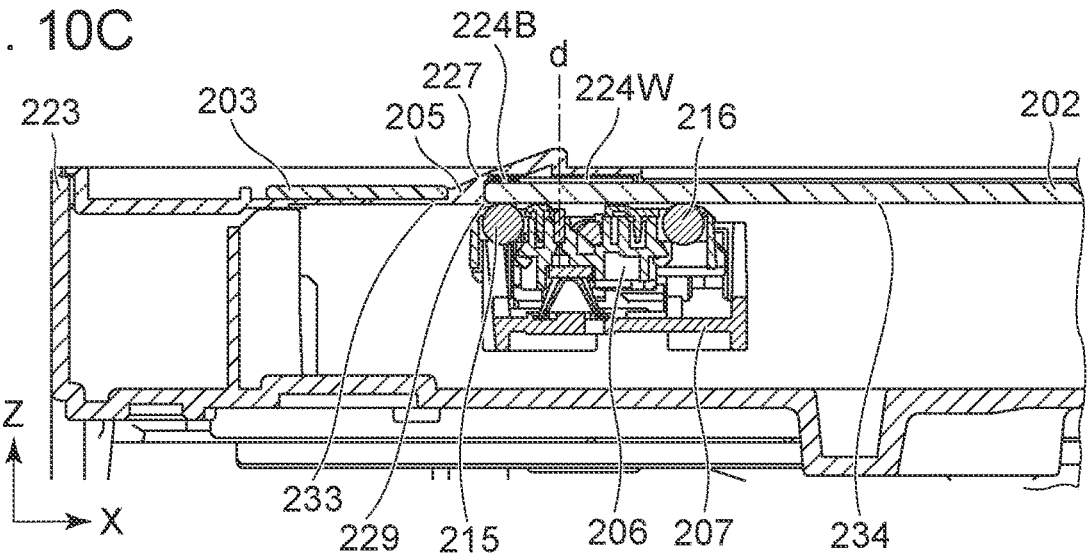

The reading unit 207 reaches the position at which it reads the position reference portion while maintaining the contact mode of these rollers (FIG. 10B). At this time, the roller 215 is in contact with the back surface of the adjacent portion 205, and the roller 216 is in contact with the document glass plate back surface 234. The design is such that the back surface of the adjacent portion 205 and the document glass plate back surface 234 are at the same height. However, in reality, a step is generated due to the tolerance of the parts. The posture of the reading unit 207 when reading the position reference portion is not the ideal posture in which the rollers 215 and 216 are in contact with the same document glass plate back surface 234, as illustrated in FIG. 10C. However, the image sensor 206 has a wide dynamic range. For example, the image sensor 206 reads a continuous gradation change from black to white at an 8-bit resolution (values between 0 and 255). In contrast, the image sensor 206 detects the position reference portion with a monochrome binarization mode (1 bit). That is, the dynamic range is wide. As a result, even if the posture of the image sensor 206 is tilted due to the part accuracy, determination in binarization is not influenced.

At the reference position c, the roller 215 maintains a mode in which it is in contact with the back surface of the adjacent portion 205 and is located at a position away from the step between the glass frame abutment portion 228 and the chamfer portion 229 of the document glass plate 202. As illustrated in FIG. 9B, the distance from the position reference portion (the reference position c) to the boundary (the step) between the document glass plate 202 and the glass frame abutment portion 228 is L1. Note that the length of the black portion 224B in the sub scanning direction is less than L1. Furthermore, as illustrated in FIG. 9A, the distance from the optical center of the rod lens array to the apex of the roller 215 is L4. Since L1 is less than L4, the relationship L1<L4 is satisfied. As a result, the reading unit 207 can read the reference position c in a region that is not influenced by the step. Furthermore, the roller 215 is not located on the side adjacent to the document glass plate 202 beyond the chamfer portion 229 of the document glass plate 202. For this reason, the operating range of the reading unit 207 which starts from the inner wall 230 of the base frame 223 is decreased. Furthermore, since the document glass plate 202 can be decreased in length, the device width in the sub scanning direction decreases. That is, in the case of the configuration in which the roller 215 is in contact with the document glass plate back surface 234 at the position at which the reference mark is read (FIG. 10B), the operating range of the reading unit 207 increases in length. Still furthermore, since the document glass plate 202 increases in length, the device size increases.

The home position d is a position away from the reference position c by a defined amount (FIG. 10C). The home position d is also the start position of the reading operation for a shading process. When moving from the reference position c to the home position d, the roller 215 gets over the step between the glass frame abutment portion 228 and the chamfer portion 229 of the document glass plate 202 and abuts on the same document glass plate back surface 234 as the roller 216. The distance from the reference position c to the end of the white reference portion 224W in the sub scanning direction is greater than the distance L4 from the optical center of the rod lens array to the apex of the roller 215. Note that the reading unit 207 stands by at the home position d until the reading operation is started.

Figure 11A:
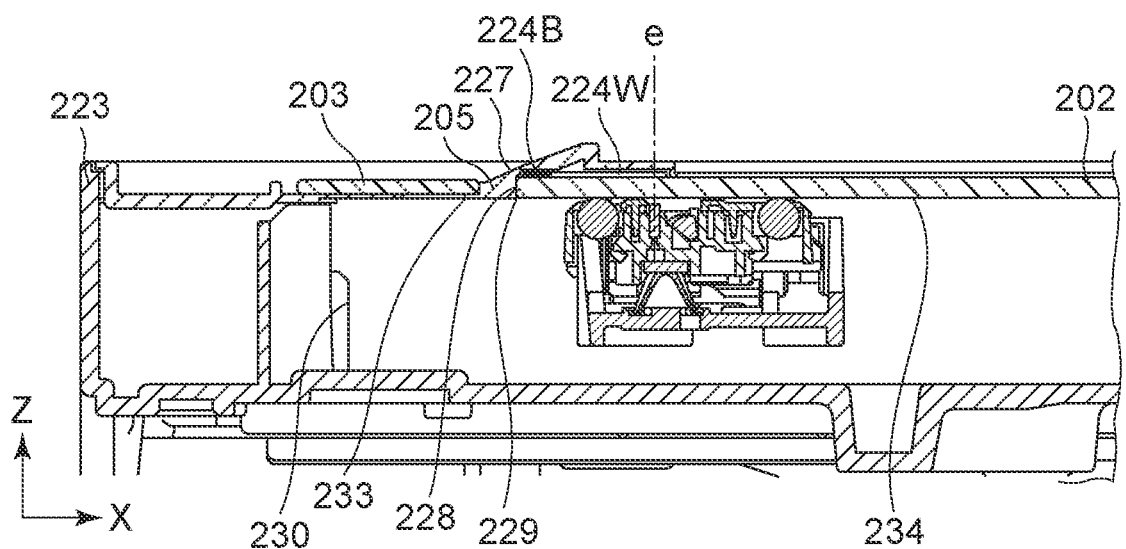
FIGS. 11A and 11B are cross-sectional views illustrating the positions of the reading unit from the time the power is turned on until the time an image is read.
Figure 11B:
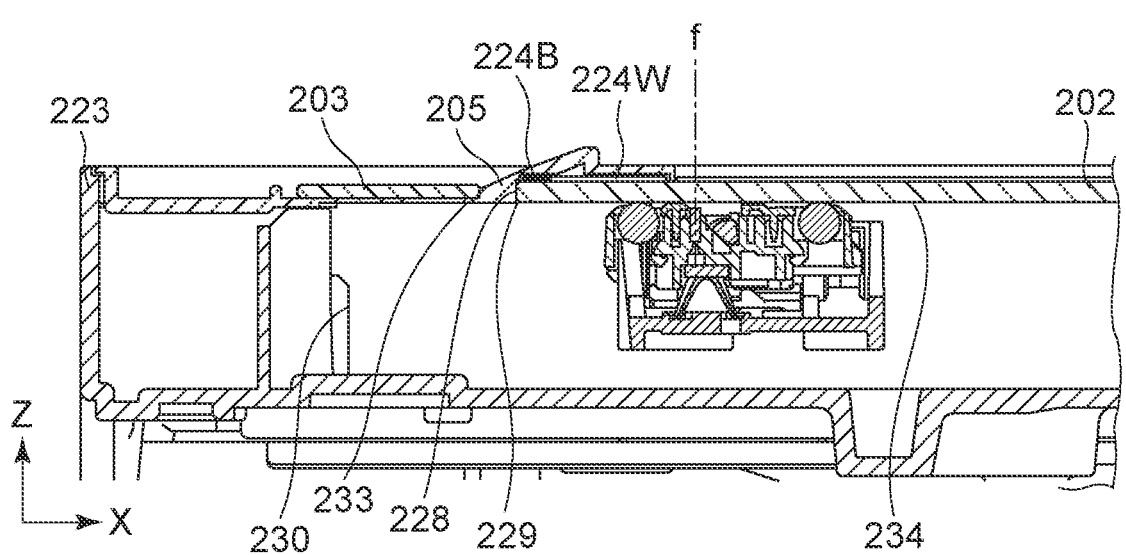

Before reading the image of an original document placed on the document glass plate 202, the control unit 115 performs the shading process on the image sensor 206. The white reference portion 224W is read to a predetermined length from the home position d, which is the start position of the shading process, in the sub scanning direction at a predetermined reading resolution, and the shading process is completed (FIG. 11A). After the shading process is completed, the reading unit 207 returns to the home position d again. In the shading process, the rollers 215 and 216 of the reading unit 207 maintain a mode of being in contact with the document glass plate back surface 234. Thus, the reading unit 207 performs the shading process in the same posture as when reading the image, and the similarity of the optical system is maintained. As a result, a shading correction is performed with high accuracy. Image reading is started from the document reading start position f, at which the reading unit 207 has been accelerated from the home position d in the sub scanning direction and has reached a stable reading speed (FIG. 11B).

Lighting Direction

The relationship between the arrangement of the white reference portion 224W and the black portion 224B of the reference member 224 and the lighting direction in the image sensor 206 is described below. FIG. 12 is a graph illustrating the brightness level of the image obtained by reading the reference member 224 by using the image sensor 206. FIG. 12 illustrates the distribution of the brightness level in the sub scanning direction corresponding to an XII-XII cross section of FIG. 4. The ordinate represents the brightness level, and the abscissa represents the distance in the sub scanning direction.

A solid line denotes the brightness level when the light is emitted in the direction of a solid line arrow 235 illustrated in FIG. 7, and a broken line denotes the brightness level when the light is emitted in the direction of a broken line arrow 236 in FIG. 7. In FIG. 7, a light guide 208 that emits light in the direction of the solid line arrow 235 is disposed on the side of the rod lens array 209 on which the white reference portion 224W is located in the sub scanning direction. Furthermore, the light emission direction is from the side with the white reference portion 224 to the side with the black portion 224B. Note that the light guide corresponding to the broken line arrow 236 is not illustrated.

As indicated by the solid line in FIG. 12, the brightness level can be considered to be constant in a region of the white reference portion 224W away from the reference position c at a stable distance 1 (about 0.5 mm). However, as indicated by the broken line, the brightness level can be considered to be constant in a region of the white reference portion 224W away from the reference position c at a stable distance 2 (about 5 mm). The white reference portion up to the stable distance cannot be used as the white reference portion for the shading correction. This is because when light is emitted from the side with the black portion 224B to the side with the white reference portion 224W, the brightness of the white reference portion slightly decreases due to the influence of the black portion. Note that when the brightness is not decreased, the light may be emitted in the direction of the broken line arrow 236.

According to the present embodiment, the light emission direction is the direction of the solid line arrow 235 illustrated in FIG. 7, from the side with the white reference portion 224 to the side with the black portion 224B. As a result, the width of the reference member 224 in the sub scanning direction can be minimized without decreasing the shading accuracy.

That is, according to the present embodiment, the image quality of the read image is improved, and the device can be reduced in size.

As described above, both the rollers can be brought into contact with the document glass plate back surface, and when the reference mark is read, only one roller can be brought into contact with the document glass plate back surface. As a result, the document glass plate can be reduced in length. In addition, the accuracy of the reading operation and the shading process is not decreased. As described above, an image reading device can be provided that does not have an increased configuration even when the position reference member is read by the reading unit.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-053210 filed Mar. 26, 2021, which is hereby incorporated by reference herein in its entirety.

What is claimed is:

1. An image reading device comprising:
a first glass having a back surface and a front surface opposite to the back surface, wherein the front surface is configured to receive an original document;
a reading unit configured to read, from a back surface side of the first glass, the original document placed on the first glass in a scanning direction by using a sensor while moving in a movement direction;
an adjacent portion having an abutment portion that abuts a side surface of the first glass in the movement direction;
a white reference portion disposed on a front surface side of the first glass, having a width greater than a width of the sensor in the scanning direction and configured to be used to correct an image read by the reading unit; and
a black portion disposed on the front surface side of the first glass, adjacent to the white reference portion, and between the abutment portion and the white reference portion in the movement direction,
wherein an edge of the black portion at a white reference portion side in the movement direction serves as a position reference of the reading unit in the movement direction,
wherein, in a case that the edge is read by the reading unit, the reading unit extends over a boundary between the adjacent portion and the first glass to contact the adjacent portion and to contact the first glass, and
wherein, in a case that the white reference portion is read by the reading unit, the reading unit is in contact with the first glass without being in contact with the adjacent portion.

2. The image reading device according to claim 1, wherein the reading unit includes a light source, and wherein the sensor is disposed on a side of the light source opposite to the movement direction.

3. The image reading device according to claim 1, wherein, after reading the white reference portion, the reading unit starts reading the original document.

4. The image reading device according to claim 1, further comprising a second glass that is located on a side of the adjacent portion that is opposite from the first glass in the movement direction, and configured to be in contact with a conveyed original document,
wherein in case that the original document is read by the reading unit, the reading unit is in contact with the first glass.

5. The image reading device according to claim 4, wherein the second glass is held by a glass frame that holds the first glass.

6. The image reading device according to claim 1, wherein the adjacent portion has an upper surface and a separation surface in the upper surface that is configured to separate the original document.

7. The image reading device according to claim 1,
wherein the reading unit includes a first contact portion and a second contact portion arranged in the movement direction from a side with the adjacent portion, and
wherein, when the reading unit reads the edge, the first contact portion is in contact with the adjacent portion, and the second contact portion is in contact with the first glass.

8. The image reading device according to claim 7, wherein a distance between the first contact portion and the sensor in the movement direction is greater than a distance from the boundary to the edge.

9. The image reading device according to claim 8, wherein the distance between the first contact portion and the sensor in the movement direction is less than a distance from the edge to an end portion of the white reference portion.

10. The image reading device according to claim 7, wherein the first contact portion and the second contact portion are rollers that are configured to rotate.

11. The image reading device according to claim 7, further comprising a second glass that is located on a side of the adjacent portion that is opposite from the first glass in the movement direction and configured to be in contact with a conveyed original document,
wherein, in case that the original document is read by the reading unit, the first contact portion is in contact with the first glass.

12. A printing device comprising:
a first glass having a back surface and a front surface opposite to the back surface, wherein the front surface is configured to receive an original document;
a reading unit configured to read, from a back surface side of the first glass, the original document placed on the first glass in a scanning direction by using a sensor while moving in a movement direction;
an adjacent portion having an abutment portion that abuts a side surface of the first glass in the movement direction;
a white reference portion disposed on a front surface side of the first glass, having a width greater than a width of the sensor in the scanning direction and configured to be used to correct an image read by the reading unit;
a black portion disposed on the front surface side of the first glass, adjacent to the white reference portion, and between the abutment portion and the white reference portion in the movement direction; and
a print head configured to record the image on a sheet,
wherein an edge of the black portion at a white reference portion side in the movement direction serves as a position reference of the reading unit in the movement direction,
wherein, in a case that the edge is read by the reading unit, the reading unit extends over a boundary between the adjacent portion and the first glass to contact the adjacent portion and to contact the first glass, and
wherein, in a case that the white reference portion is read by the reading unit, the reading unit is in contact with the first glass without being in contact with the adjacent portion.

* * * * *